(12) United States Patent
Nozu et al.

(10) Patent No.: US 9,753,278 B2
(45) Date of Patent: Sep. 5, 2017

(54) ACTUATOR AND MOVABLE MIRROR

(71) Applicant: CANON KABUSHIKI KAISHA, Tokyo (JP)

(72) Inventors: Kyota Nozu, Namerikawa (JP); Yasuhiro Shimada, Sagamihara (JP); Koichiro Nakanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/372,429

(22) PCT Filed: Dec. 28, 2012

(86) PCT No.: PCT/JP2012/084315
§ 371 (c)(1),
(2) Date: Jul. 15, 2014

(87) PCT Pub. No.: WO2013/108584
PCT Pub. Date: Jul. 25, 2013

(65) Prior Publication Data
US 2014/0362460 A1 Dec. 11, 2014

(30) Foreign Application Priority Data
Jan. 19, 2012 (JP) .................. 2012-008935

(51) Int. Cl.
*G02B 26/08* (2006.01)
*H02N 1/00* (2006.01)
*G02B 7/182* (2006.01)

(52) U.S. Cl.
CPC ......... *G02B 26/0816* (2013.01); *G02B 7/182* (2013.01); *G02B 26/0825* (2013.01);
(Continued)

(58) Field of Classification Search
CPC ........ H02N 1/006; H02N 1/008; G02B 7/182; G02B 26/0816; G02B 26/0841; G02B 26/0825
(Continued)

(56) References Cited

U.S. PATENT DOCUMENTS 6,838,738 B1  1/2005 Costello
6,995,495 B2 *  2/2006 Ko et al. .................. 310/309
(Continued)

FOREIGN PATENT DOCUMENTS

FR        2865201 A1   7/2005
JP     2004139085 A    5/2004
(Continued)

OTHER PUBLICATIONS

Noell, et al., "Compact Large-Stroke Piston-Tip-Tilt Actuator and Mirror", Proc. of SPIE, (2007), pp. 64670Q-1-64670Q-7, vol. 6467.

*Primary Examiner* — Stephone B Allen
*Assistant Examiner* — Rahman Abdur
(74) *Attorney, Agent, or Firm* — Canon U.S.A., Inc. IP Division

(57) ABSTRACT

The present invention employs an actuator including: a movable portion connected to a reflecting member having a reflective surface; a movable comb electrode disposed at a distance from the reflecting member, supported by the movable portion, and extended in a direction parallel to the reflective surface; a stationary comb electrode supported by a supporting portion, extends in the direction parallel to the reflective surface, and disposed alternately with the movable comb electrode; and a voltage controller that applies a voltage to the movable comb electrode and the stationary comb electrode to displace the movable comb electrode and the movable portion in a direction normal to the reflective surface. A portion that supports the movable comb electrode and a portion that supports the stationary comb electrode are disposed such that the movable comb electrode and the stationary comb electrode pass each other.

9 Claims, 17 Drawing Sheets

(52) U.S. Cl.
CPC ......... *G02B 26/0841* (2013.01); *H02N 1/006* (2013.01); *H02N 1/008* (2013.01)

(58) Field of Classification Search
USPC ....... 359/849, 877, 872, 904, 871, 873, 874, 359/875
See application file for complete search history.

(56) References Cited

U.S. PATENT DOCUMENTS

| | | | |
|---|---|---|---|
| 2002/0109894 A1* | 8/2002 | Clark | G02B 26/06 359/224.1 |
| 2003/0048036 A1* | 3/2003 | Lemkin | 310/309 |
| 2004/0119376 A1 | 6/2004 | Chou et al. | |
| 2008/0151345 A1* | 6/2008 | Zhou | B81B 3/004 359/224.1 |

FOREIGN PATENT DOCUMENTS

| | | |
|---|---|---|
| JP | 2005341788 A | 12/2005 |
| JP | 2008-152016 A | 7/2008 |
| JP | 2009-198700 A | 9/2009 |
| JP | 2010515095 A | 5/2010 |
| WO | 2008/087691 A1 | 7/2008 |

\* cited by examiner

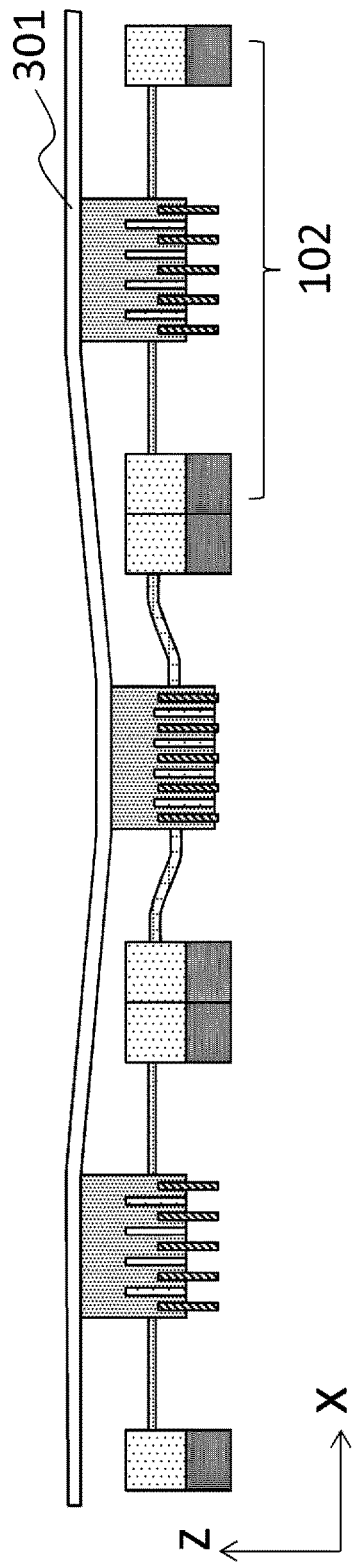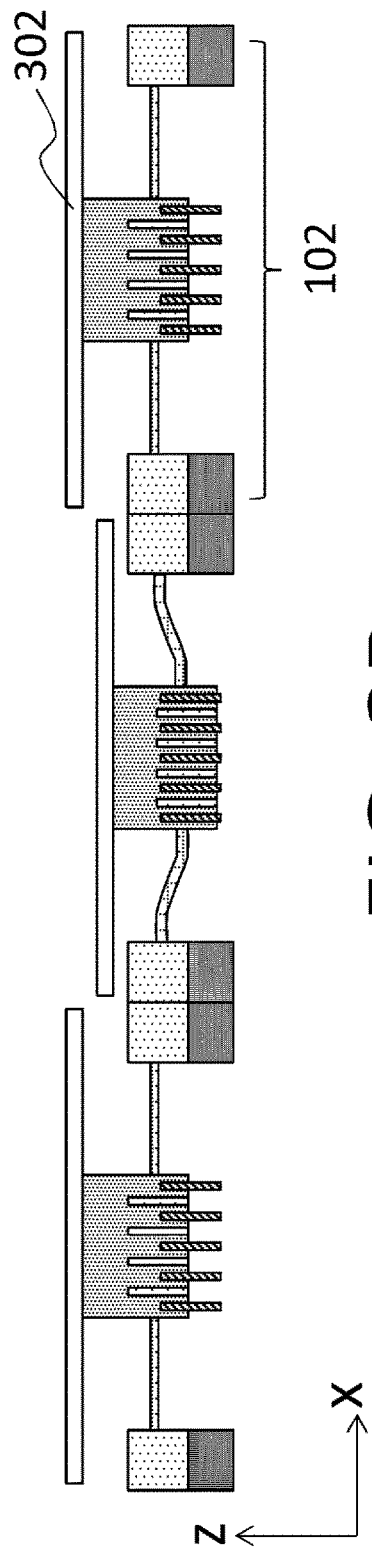
FIG. 3A
FIG. 3B

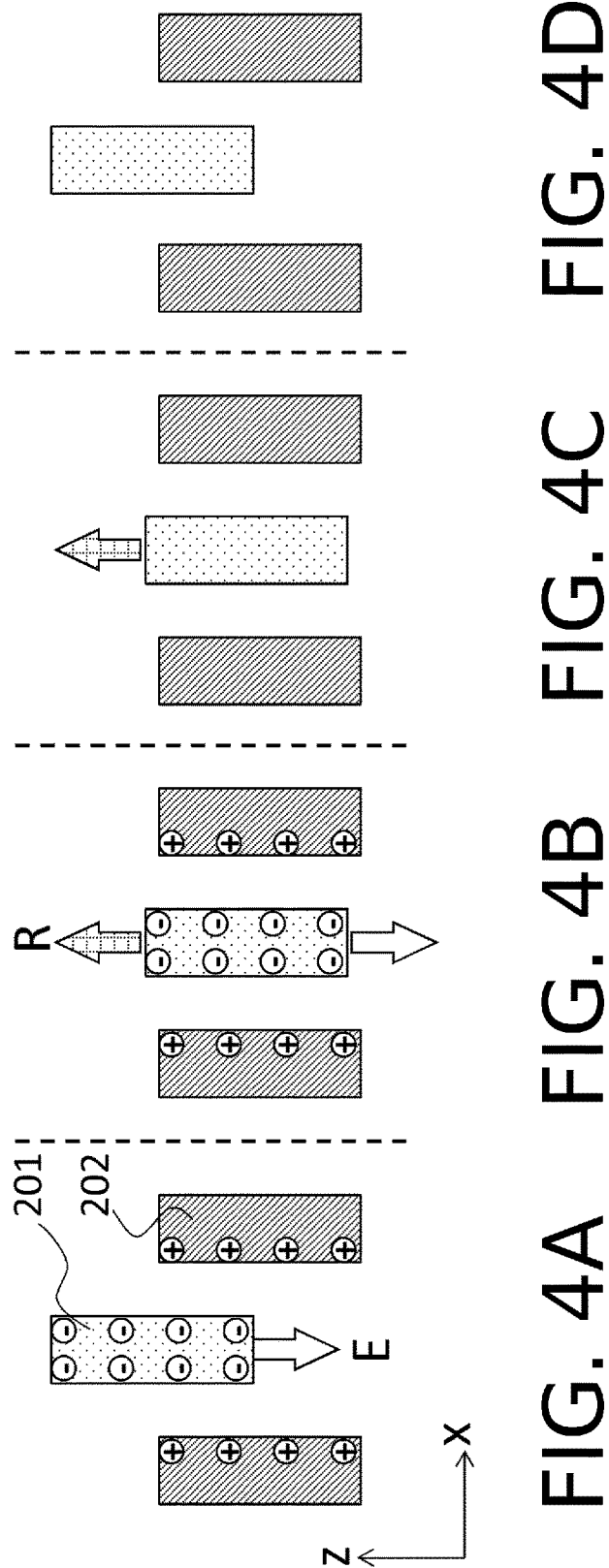

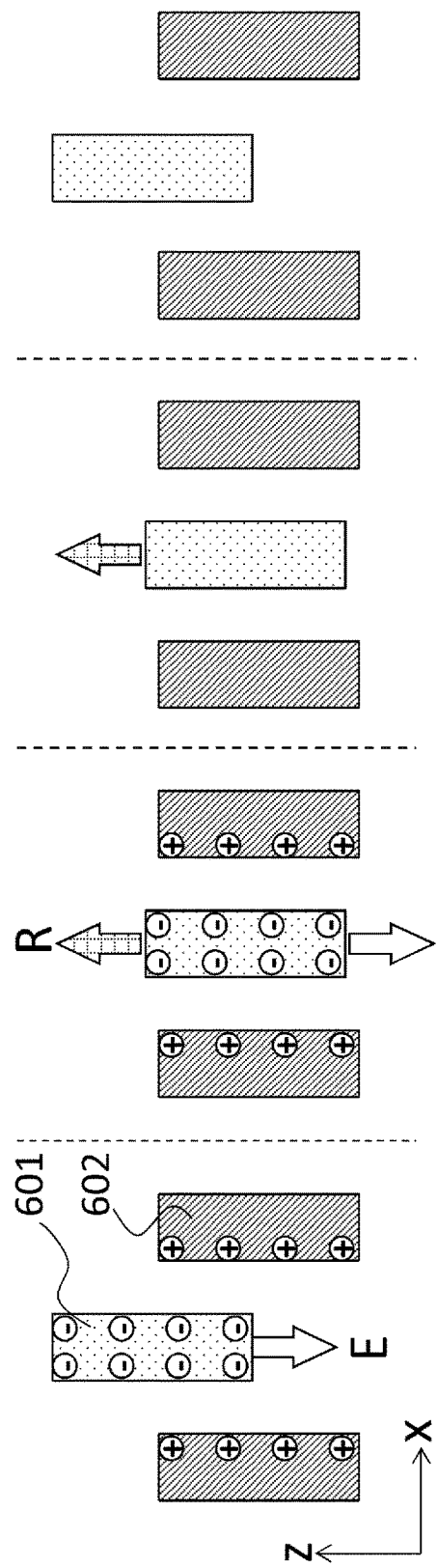

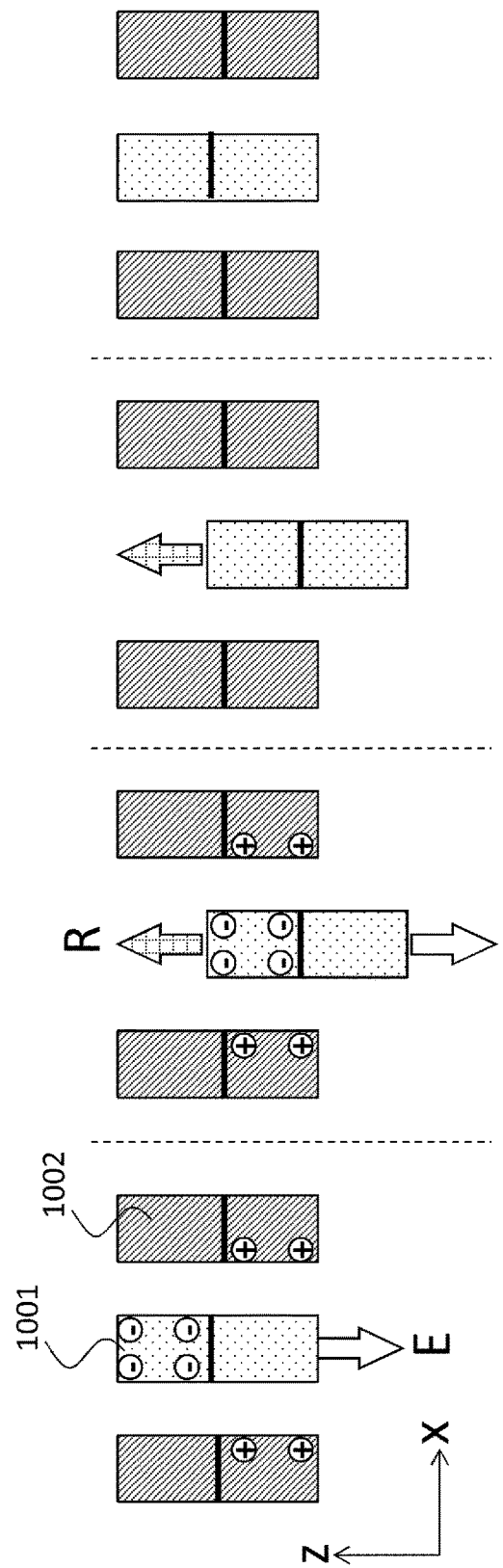

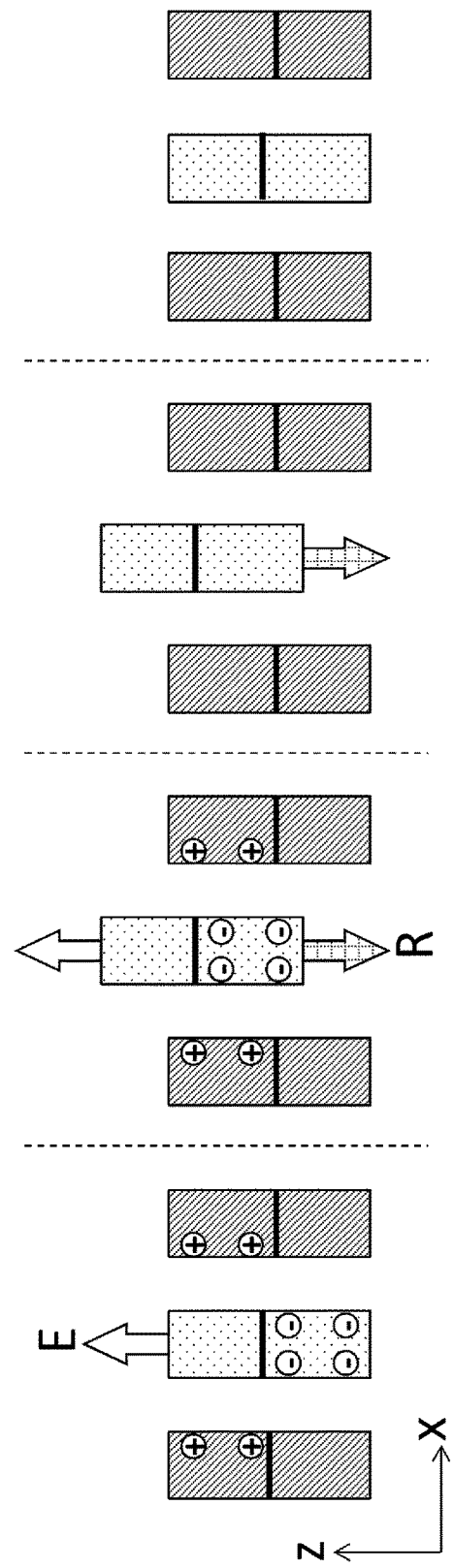

ACTUATOR AND MOVABLE MIRROR

TECHNICAL FIELD

The present invention relates to an actuator and a movable mirror.

BACKGROUND ART

A movable mirror of such a type that the movable mirror is displaced according to an electrostatic attractive force is expected to be applied in various fields that use light. For example, the movable mirror can be used as a wavefront correction device for adaptive optics which is incorporated in a fundus examination apparatus, an astronomical telescope, and the like. A typical example of the method which employs such a movable mirror that is displaced according to an electrostatic attractive force includes a method of displacing the movable mirror using two parallel flat electrodes. However, a small displacement amount is one of the drawbacks of the parallel flat electrodes.

In contrast, a movable mirror which provides a larger displacement amount using comb electrodes has been proposed recently. An example thereof is disclosed in PTL 1. As shown in FIG. 14, in this movable mirror, a supporting portion 530 that supports an comb electrode 520 on the moving side and a supporting portion 570 that supports an comb electrode 510 on the stationary side are respectively located above and below in the vertical direction on the drawing sheet. The movable comb electrode and the stationary comb electrode face each other and are disposed alternately. Due to this, since an overlapped area is larger than that of the conventional example that uses parallel flat electrodes, the electrostatic attractive force increases, and the displacement amount can be increased.

CITATION LIST

Patent Literature

PTL 1: US Patent Application Publication No. 2002/0109894

SUMMARY OF INVENTION

Technical Problem

However, in the structure disclosed in PTL 1, since the comb electrodes and the supporting portions are disposed in the moving direction of the movable comb electrode, the electrostatic attractive force becomes extremely larger than a restoring force of a spring, and a phenomenon called pull-in (retraction) in which comb teeth on the moving side collide with the supporting portion on the stationary side may occur. Thus, this structure has a problem in that it is difficult to obtain a larger displacement amount.

With the foregoing in view, an object of the present invention is to provide a technique of suppressing the occurrence of a pull-in phenomenon in a movable mirror that uses an actuator that includes an comb electrode.

Solution to Problem

The present invention provides an actuator comprising:
a movable portion that is connected to a reflecting member having a reflective surface;
a movable comb electrode that is disposed at a distance from the reflecting member, is supported by the movable portion, and extends in a direction parallel to the reflective surface;
a supporting portion;
a stationary comb electrode that is supported by the supporting portion, extends in the direction parallel to the reflective surface, and is disposed alternately with the movable comb electrode; and
a voltage controller that applies a voltage to the movable comb electrode and the stationary comb electrode so as to displace the movable comb electrode and the movable portion in a direction normal to the reflective surface,
wherein a portion of the movable portion that supports the movable comb electrode and a portion of the supporting portion that supports the stationary comb electrode are disposed such that the movable comb electrode and the stationary comb electrode pass each other when the movable comb electrode is displaced in the direction normal to the reflective surface.

The present invention also provides an actuator comprising:
a movable portion that is connected to a reflecting member having a reflective surface;
a movable comb electrode that is disposed at a distance from the reflecting member, is supported by the movable portion, and extends in a direction parallel to the reflective surface;
a supporting portion;
a stationary comb electrode that is supported by the supporting portion, extends in the direction parallel to the reflective surface, and is disposed alternately with the movable comb electrode; and
a voltage controller that applies a voltage to the movable comb electrode and the stationary comb electrode so as to displace the movable comb electrode and the movable portion in a direction normal to the reflective surface,
wherein the movable comb electrode and the stationary comb electrode are disposed so as to pass each other when the movable comb electrode is displaced in the direction normal to the reflective surface.

Advantageous Effects of Invention

According to the present invention, it is possible to provide a technique of suppressing the occurrence of a pull-in phenomenon in a movable mirror that uses an actuator that includes an comb electrode.

Further features of the present invention will become apparent from the following description of exemplary embodiments with reference to the attached drawings.

BRIEF DESCRIPTION OF DRAWINGS

FIGS. 3A and 3B are cross-sectional views showing a structure of a reflecting portion according to the present invention.

FIGS. 4A to 4D are schematic views for explaining the way that comb teeth according to the present invention are moved.

FIGS. 8A to 8D are schematic views for explaining the way that comb teeth according to the first example are moved.

FIGS. 12A to 12D are schematic views for explaining the way that comb teeth according to the second example are moved.

FIGS. 13A to 13D are another schematic views for explaining the way that comb teeth according to the second example are moved.

DESCRIPTION OF EMBODIMENTS

Figure 1:
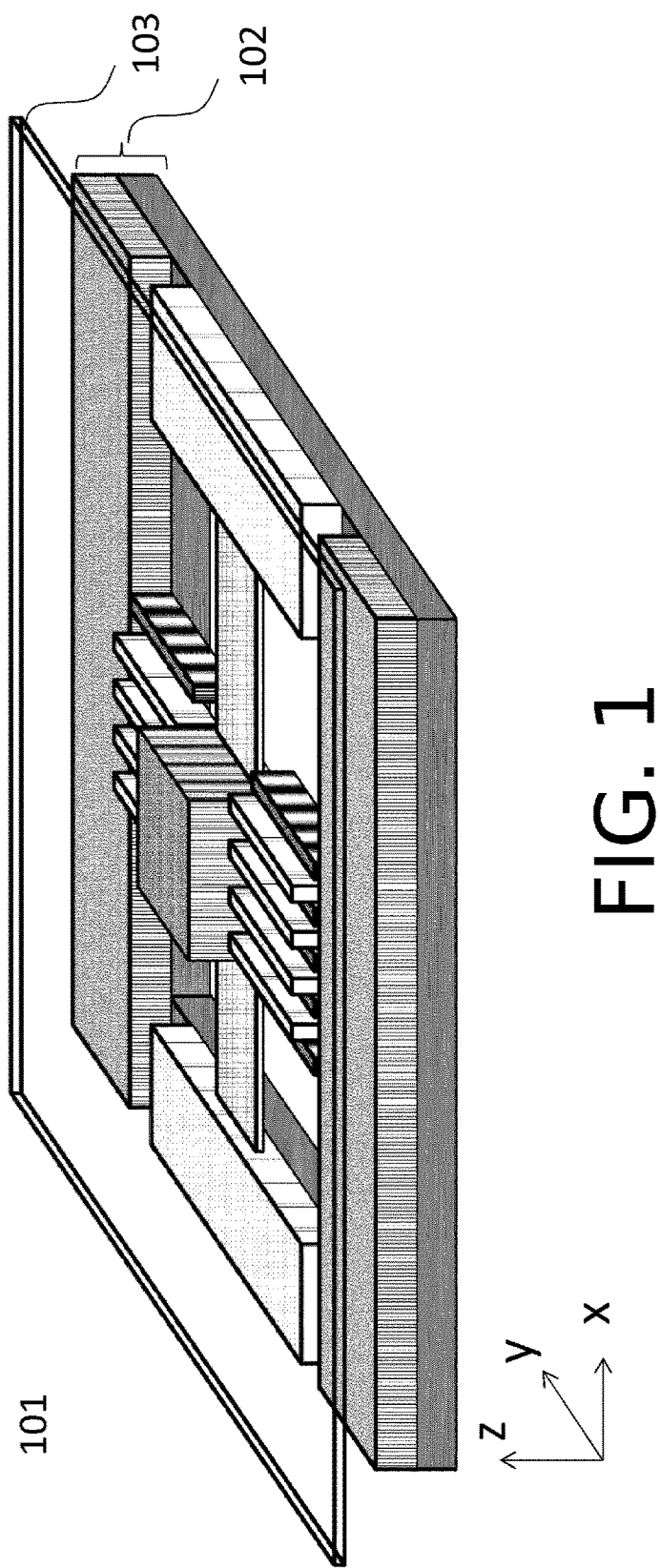
FIG. 1 is a perspective view schematically showing a structure of the present invention.

Hereinafter, an electrostatic comb movable mirror according to the present invention will be described with reference to FIG. 1. Here, FIG. 1 is a perspective view of an electrostatic comb movable mirror which is an embodiment of the present invention. A movable mirror 101 shown in FIG. 1 includes an actuator portion 102 that has a driving function and a reflecting portion 103 that has a reflecting function.

Figure 2A:
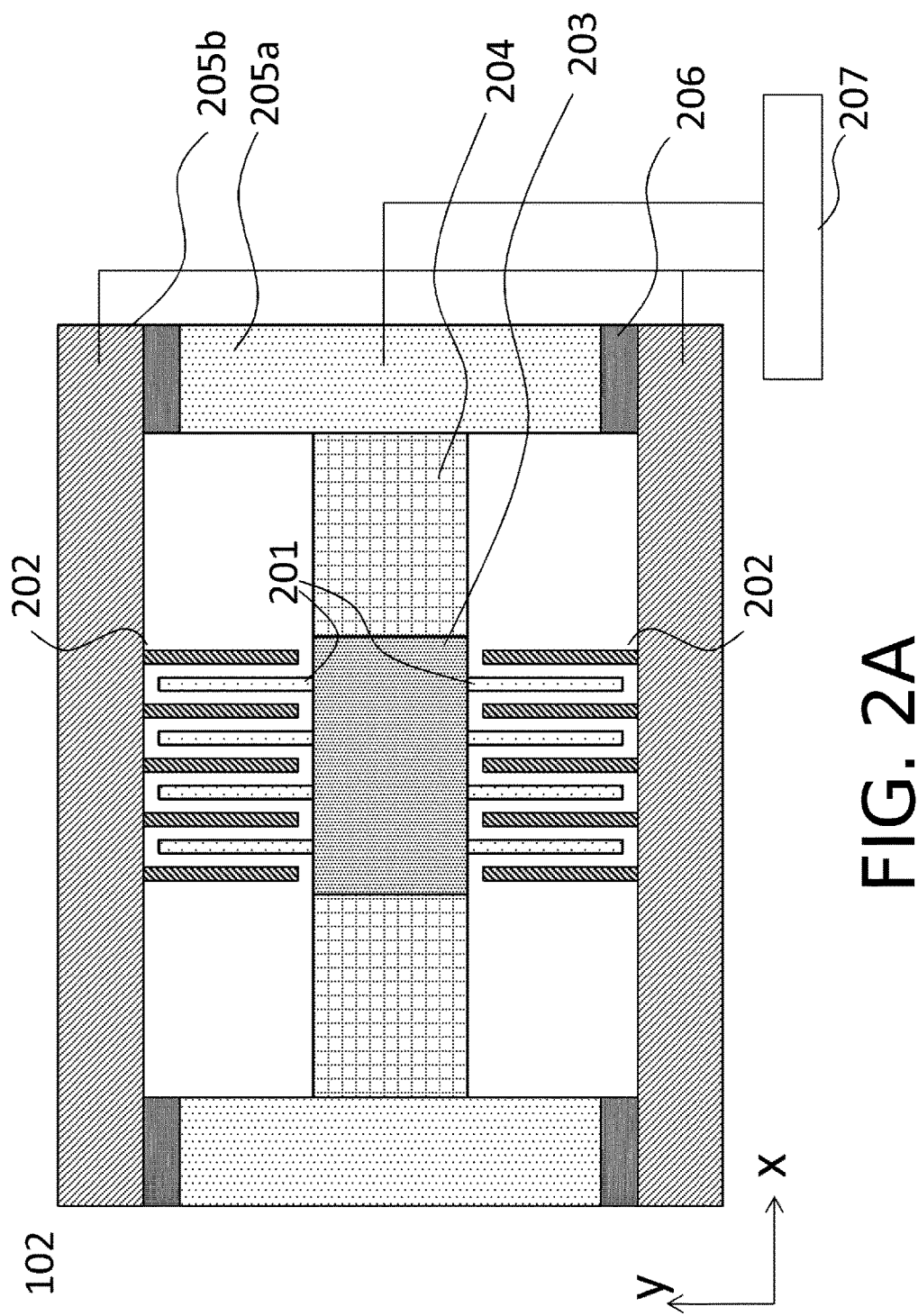
FIG. 2A is a top view schematically showing the structure of the present invention.

FIG. 2A shows a top view of the actuator portion 102. In FIG. 2A, a lateral direction of the drawing sheet will be referred to as an x-direction, a longitudinal direction of the drawing sheet will be referred to as a y-direction, and a vertical direction of the drawing sheet will be referred to as a z-direction. An xy-plane shown in the figure is a plane parallel to a substrate. The actuator portion 102 includes a movable comb electrode 201, a stationary comb electrode 202, a movable portion 203, a spring 204, and a supporting portion 205 (205a, 205b).

The movable portion 203 is coupled with the spring 204 and is connected to the movable comb electrode 201 and the reflecting portion 103. One end of the spring 204 is fixed to the supporting portion 205a. The movable comb electrode 201 and the spring 204 are connected to a side wall of the movable portion 203, and the reflecting portion 103 is connected to an upper surface of the movable portion 203.

The movable comb electrode 201 extends in the y-direction from a side wall of the movable portion 203 parallel to the xz-plane, and the stationary comb electrode 202 extends in the y-direction from a side wall of the supporting portion 205b parallel to the xz-plane. Since the side walls of the movable portion and the supporting portion face each other, the movable comb electrode 201 and the stationary comb electrode 202 are disposed to face each other, and the respective comb teeth are arranged alternately.

Figure 2B:
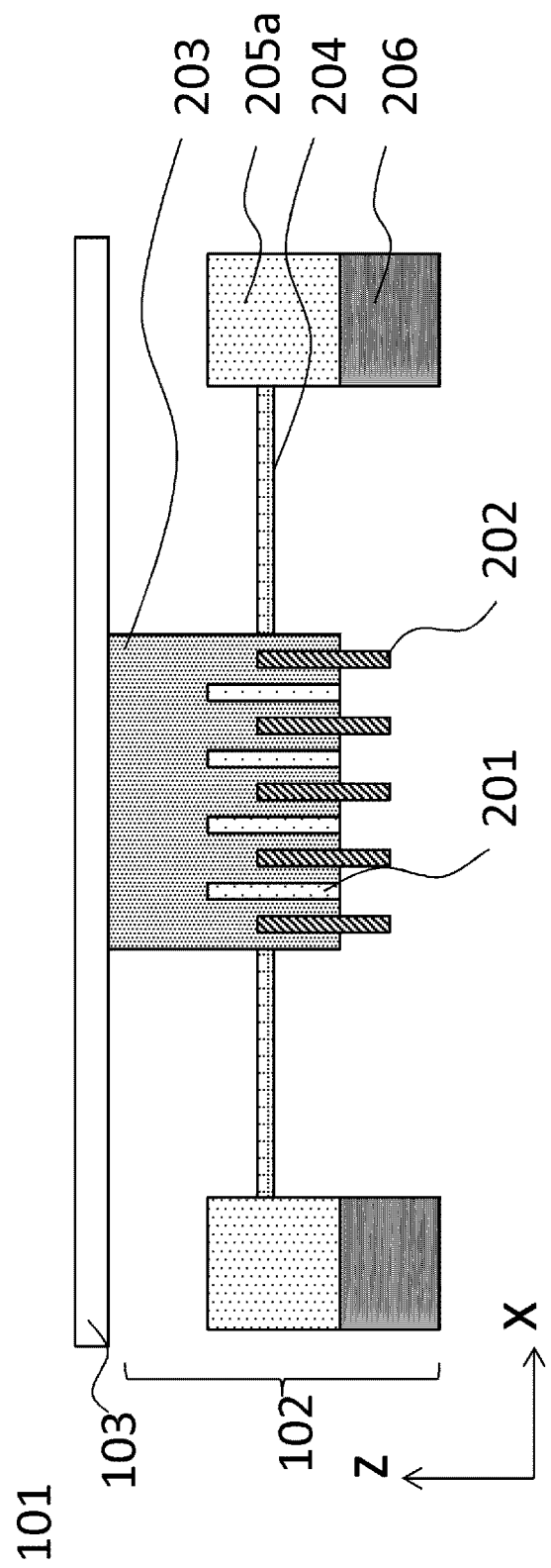
FIG. 2B is a cross-sectional view schematically showing the structure of the present invention.

FIG. 2B shows a cross-sectional view of the movable mirror 101. Since the heights in the z-direction of a side surface of the movable comb electrode 201 and a side surface of the stationary comb electrode 202 are different, a portion where the comb electrodes do not overlap each other needs to be present. That is, the comb electrodes have a portion where the comb electrodes do not overlap each other in a direction vertical to the reflective surface of the reflecting portion 103. Here, "different heights" does not mean that the sizes in the z-direction of both comb electrodes are different but means that both comb electrodes are shifted from each other in the z-direction in an initial state where no voltage is applied. This is because the present invention employs a scheme (movable overlap type) that uses a phenomenon in which when comb electrodes are attracted by an electrostatic attractive force, a force acts in a direction where the comb electrodes overlap each other, and the comb electrodes are moved. In this phenomenon, when the comb electrodes overlap each other completely, the comb electrodes are not moved further, it is necessary to decrease an overlapped portion at the initial position and to increase the overlapped portion when a voltage is applied. As shown in the figure, the movable comb electrode 201 and the reflecting portion 103 are located at a predetermined distance in the z-direction, and the stationary comb electrode 202 is not in contact with other members in the z-direction. Thus, even when an electrostatic attractive force occurs and attracts the comb electrodes, any of the comb electrodes does not collide with a member connected to the other comb electrode. As can be understood from FIGS. 2A and 2B, the movable comb electrode 201 is supported by a predetermined portion of the movable portion 203 in a cantilevered manner to extend in a direction parallel to the reflective surface. Further, the stationary comb electrode 202 is supported by a predetermined portion of the supporting portion 205b in a cantilevered manner to extend in a direction parallel to the reflective surface. When the reflecting portion continuously covers a plurality of actuators as will be described later, since the reflecting portion is deformed, there is a possibility that the angle of the reflective surface may not remain constant. In that case, the respective comb electrodes extend in a direction parallel to at least a portion of the reflective surface connected to the movable portion.

Although FIG. 2B shows the movable comb electrode 201 that is disposed above in the z-direction in relation to the stationary comb electrode 202, a positional relationship of both comb electrodes may be reversed.

The spring 204 extends in the x-direction from a side wall of the movable portion 203 parallel to the yz-plane and is fixed to a side wall of the supporting portion 205a parallel to the yz-plane. When the movable portion 203 is displaced in a direction other than the z-direction, the movable comb electrode 201 and the stationary comb electrode 202 may interfere. Thus, it is necessary to suppress displacement in a direction other than the z-direction (in other words, a direction other than the direction normal to the reflective surface of the reflecting portion 103).

The stationary comb electrode 202 and the spring 204 are fixed by the supporting portions 205b and 205a, respectively. Independent electric potentials are applied to the stationary comb electrode 202 and the movable comb electrode 201. Thus, an isolation groove 206 is provided so as to electrically isolate the supporting portion 205b that belongs to the stationary comb electrode 202 from the supporting portion 205a that belongs to the movable comb electrode 202. Wires are disposed in the isolated supporting portions and are connected to a voltage control circuit 207.

The reflecting portion 103 has an optically reflecting function of reflecting light to be corrected. The reflecting portion 103 has the reflective surface in order to reflect light. The reflecting portion 103 is disposed so as to cover the actuator portion 102 and is coupled with the movable portion 203. The reflecting portion corresponds to a reflecting member of the present invention.

FIG. 3 is a view showing a case where a plurality of actuator portions 102 is disposed. In contrast, the reflecting portion may be a continuous surface 301 that covers the plurality of actuator portions 102 as a whole as shown in FIG. 3A and may be independent surfaces 302 that individually cover the respective actuator portions as shown in FIG. 3B. By individually moving the movable portions 203 of the respective actuators, it is possible to obtain a desired shape. By doing so, since an optical path length of light reflected can be changed by the respective actuator portions, the actuator portions can be used as a wavefront correction device.

Next, a method of moving the movable portion 203 will be described with reference to FIG. 4. FIG. 4 is a cross-sectional view of a portion in which the movable comb electrode 201 and the stationary comb electrode 202 are arranged alternately. By applying charges having the opposite signs to the movable comb electrode 201 and the stationary comb electrode 202, it is possible to move the movable comb electrode 201 in the z-direction (a direction normal to the reflective surface of the reflecting portion 103). A working electrostatic attractive force Fz in the z-direction when a potential difference is applied between the movable comb electrode and the stationary comb electrode is expressed as Expression (1) below.

[Math. 1]

$$F_z = \frac{\varepsilon_0 N h}{2g}(V_m - V_f)^2 \quad (1)$$

Here, $\varepsilon_0$ is a dielectric constant of vacuum, N is the number of gaps between comb electrodes, h is an overlap distance between the movable comb electrode and the stationary comb electrode, $V_m$ is an electric potential of the movable comb electrode, $V_f$ is an electric potential of the stationary comb electrode, and g is a gap width between comb electrodes.

For example, when the movable comb electrode 201 and the stationary comb electrode 202 are disposed as shown in FIG. 4, the following method may be used to move the movable comb electrode 201 downward in the z-direction. First, as in the state immediately after application of a voltage shown in FIG. 4A, when charges having the opposite signs are applied to the movable comb electrode 201 and the stationary comb electrode 202, an electrostatic attractive force (E) is generated, and the electrodes are attracted. As a result, although the movable comb electrode 201 tries to approach the stationary comb electrode 202, since the electrostatic attractive force is evenly distributed to the left and right side in relation to the x-direction, the movable comb electrode 201 is displaced downward in the z-direction.

Subsequently, a balanced state as shown in FIG. 4B is created. That is, the movable comb electrode 201 stops at such a position that a restoring force (R) of the spring 204 is balanced with the electrostatic attractive force that moves the movable portion 203.

Subsequently, when a potential difference between the movable comb electrode 201 and the stationary comb electrode 202 is set to 0, a state where no charge is applied is created as shown in FIG. 4C. After the voltage is removed, the movable comb electrode 201 returns to its initial position according to the restoring force of the spring 204. A state after this displacement is shown in FIG. 4D.

Although this embodiment describes displacement according to an electrostatic attractive force, displacement may be realized according to an electrostatic repulsive force.

In the structure disclosed in PTL 1, when the movable comb electrode 201 is moved, the comb electrode and the supporting portion are disposed in the z-direction which is a moving direction of the movable comb electrode. Thus, an electrostatic attractive force is generated between a distal end surface of the comb electrode and the surface of the supporting portion. When the electrostatic attractive force is extremely larger than the restoring force of the spring, a pull-in phenomenon occurs, and the comb electrode collides with the supporting portion. However, according to the structure of this embodiment, since the supporting portion is not disposed in the z-direction which is the moving direction of the movable comb electrode, a pull-in phenomenon does not occur. That is, in the structure of the present invention, even when an electrostatic attractive force acts, both comb electrodes can pass each other without making collision. Thus, a pull-in phenomenon does not occur, and a short of electrodes does not occur.

Since the displacement amount can be predicted by measuring an electrostatic capacitance value, feedback control can be performed.

Further, the structure of the present invention can be used in vacuum and may be used in the air. If the structure as disclosed in PTL 1 is used in the air, when comb teeth are moved, the air between the supporting portions causes damping, and a response speed may decrease. However, according to the structure of the present invention, it is possible to suppress the influence of damping.

Various modifications and changes can be made to this embodiment within a range without departing from the spirit of the present invention.

For example, in this embodiment, although the reflecting portion 103 and the movable portion 203 are connected, a post may be provided between the reflecting portion 103 and the movable portion 203. In this case, it is necessary to provide the post in such a range that the reflecting portion 103 does not interfere with the comb electrode.

Moreover, in this embodiment, the movable portion 203, the spring 204, and the supporting portion 205 are formed of silicon that is doped with conductive impurities in order to apply electric potentials to the movable comb electrode 201 and the stationary comb electrode 202. However, rather than forming these member using conductive materials, a method of feeding current by forming wires or feeding current through bonding wires may be used.

First Example

Figure 5:
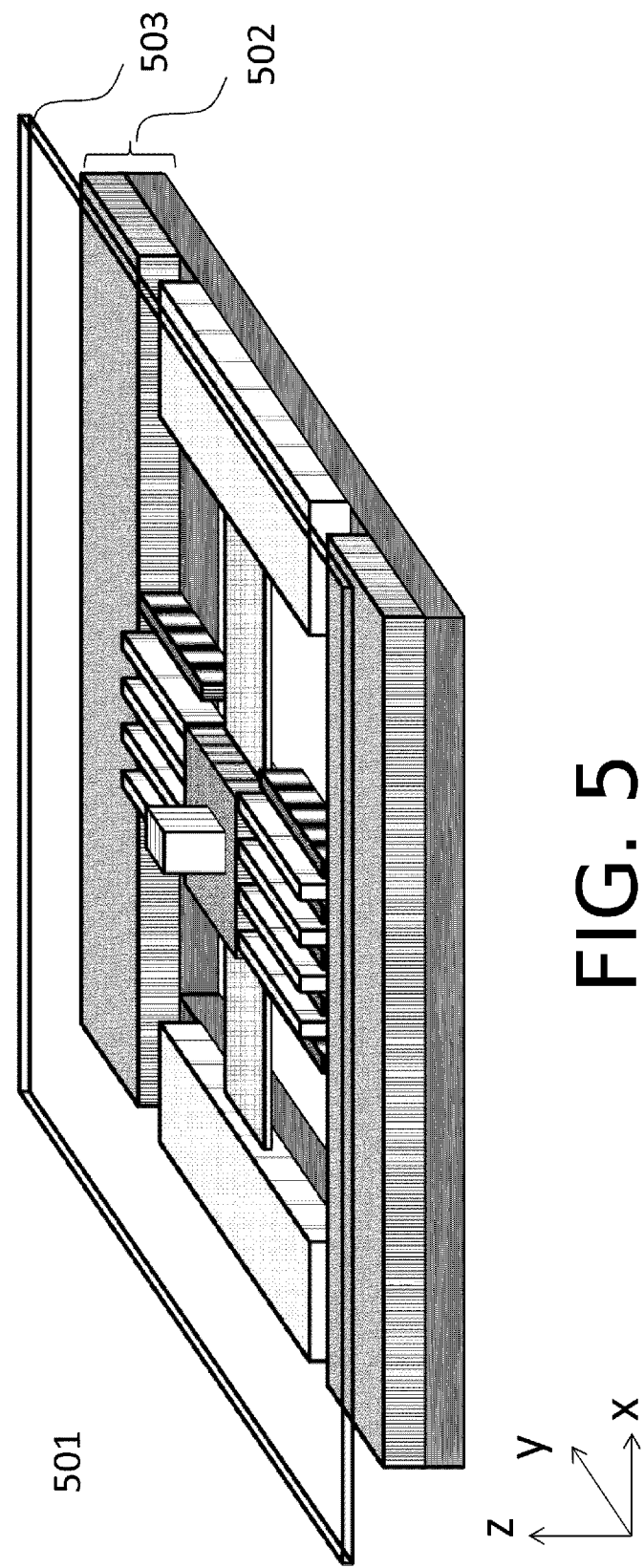
FIG. 5 is a perspective view schematically showing a structure of a first example.

Hereinafter, an electrostatic comb movable mirror according to a first example of the present invention will be described with reference to FIG. 5. Here, FIG. 5 is a perspective view of an electrostatic comb movable mirror 501 according to the first example of the present invention. A movable mirror 501 shown in FIG. 5 includes an actuator portion 502 that has a driving function and a reflecting portion 503 that has a reflecting function.

Figure 6A:
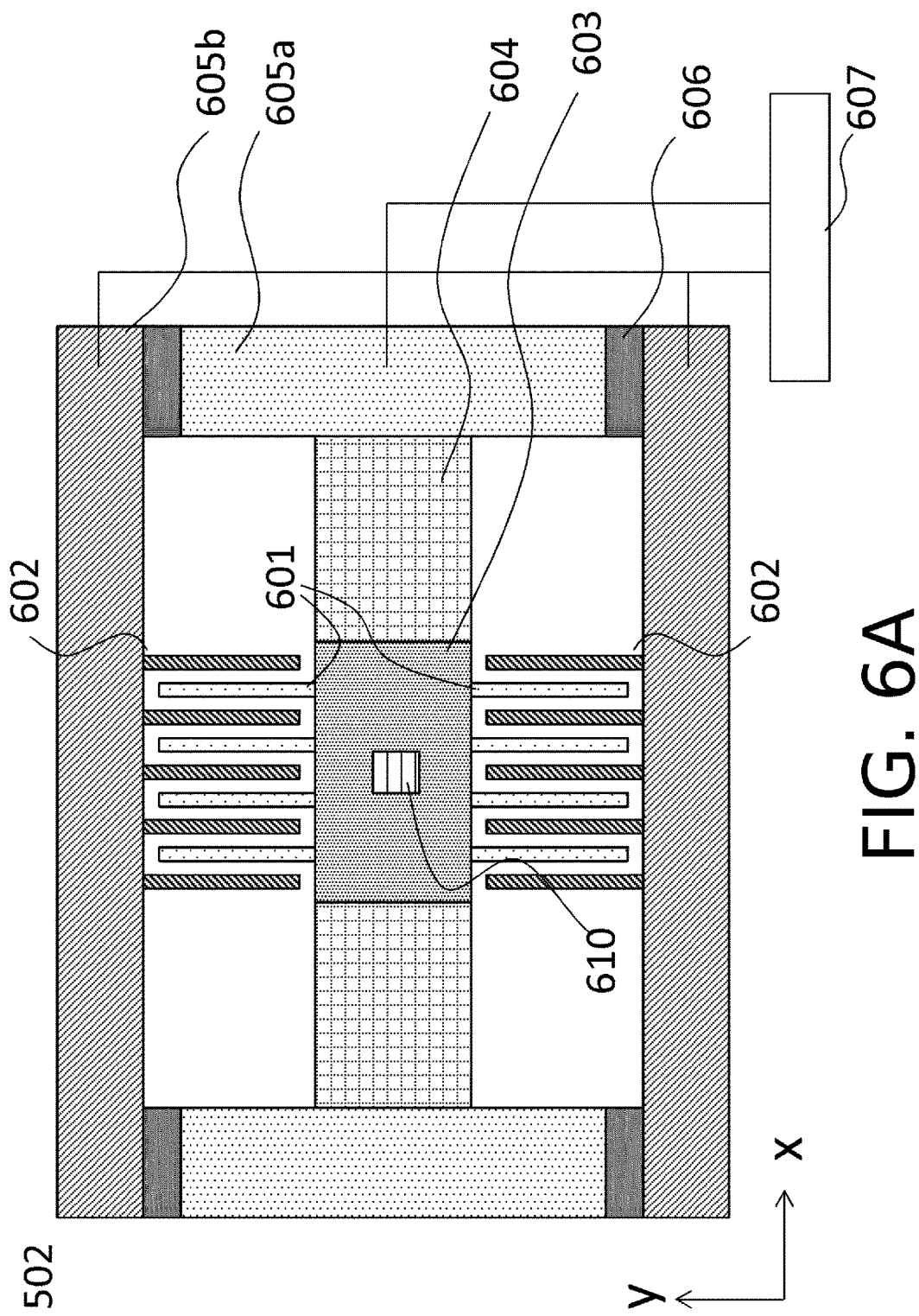
FIG. 6A is a top view schematically showing the structure of the first example.

FIG. 6A shows a top view of the actuator portion 502. In FIG. 6A, a lateral direction of the drawing sheet will be referred to as an x-direction, a longitudinal direction of the drawing sheet will be referred to as a y-direction, and a vertical direction of the drawing sheet will be referred to as a z-direction. An xy-plane shown in the figure is a plane parallel to a substrate. The actuator portion 502 includes a movable comb electrode 601, a stationary comb electrode 602, a movable portion 603, a spring 604, a supporting portion 605 (605a, 605b), and a post 610.

The movable portion 603 is coupled with the spring 604 and is connected to the movable comb electrode 601 and the post 610. One end of the spring 604 is fixed to the supporting portion 605a. In this example, the movable portion 603 has a quadrangular prism shape, the movable comb electrode 601 is disposed on two surfaces of the four side walls that are parallel to the xz-plane, and the spring 604 of which one end is fixed to the supporting portion 605b is coupled with the two surfaces that are parallel to the yz-plane. Further, the post 610 for transferring displacement of the movable portion 603 to the reflecting portion 503 is provided on the upper surface.

The movable comb electrode 601 extends in the y-direction from a side wall of the movable portion 603 parallel to the xz-plane, and the stationary comb electrode 602 extends in the y-direction from a side wall of the supporting portion 605b parallel to the xz-plane. Since the side walls of the movable portion and the supporting portion face each other, the movable comb electrode 601 and the stationary comb electrode 602 are disposed to face each other, and the respective comb teeth are arranged alternately. In this example, the movable comb electrode 601 and the stationary comb electrode 602 have a thickness of 200 μm and a length of 200 μm. The number of comb electrodes for one actuator is 40 for the movable comb electrode and 42 for the movable comb electrode, and the number of gaps between the comb electrodes is 80. The thickness of the comb electrode means the size in the z-direction, the length means the size in the y-direction, and the width means the size in the x-direction.

Since the heights in the z-direction of a side surface of the movable comb electrode 601 and a side surface of the stationary comb electrode 602 are different, a portion where the comb electrodes do not overlap each other needs to be present. This is because the present invention employs a scheme (movable overlap type) that uses a phenomenon in which when comb electrodes are attracted by an electrostatic attractive force, a force acts in a direction where the comb electrodes overlap each other, and the comb electrodes are moved. In this phenomenon, when the comb electrodes overlap each other completely, the comb electrodes are not moved further, it is necessary to decrease an overlapped portion at the initial position and to increase the overlapped portion when a voltage is applied.

Figure 6B:
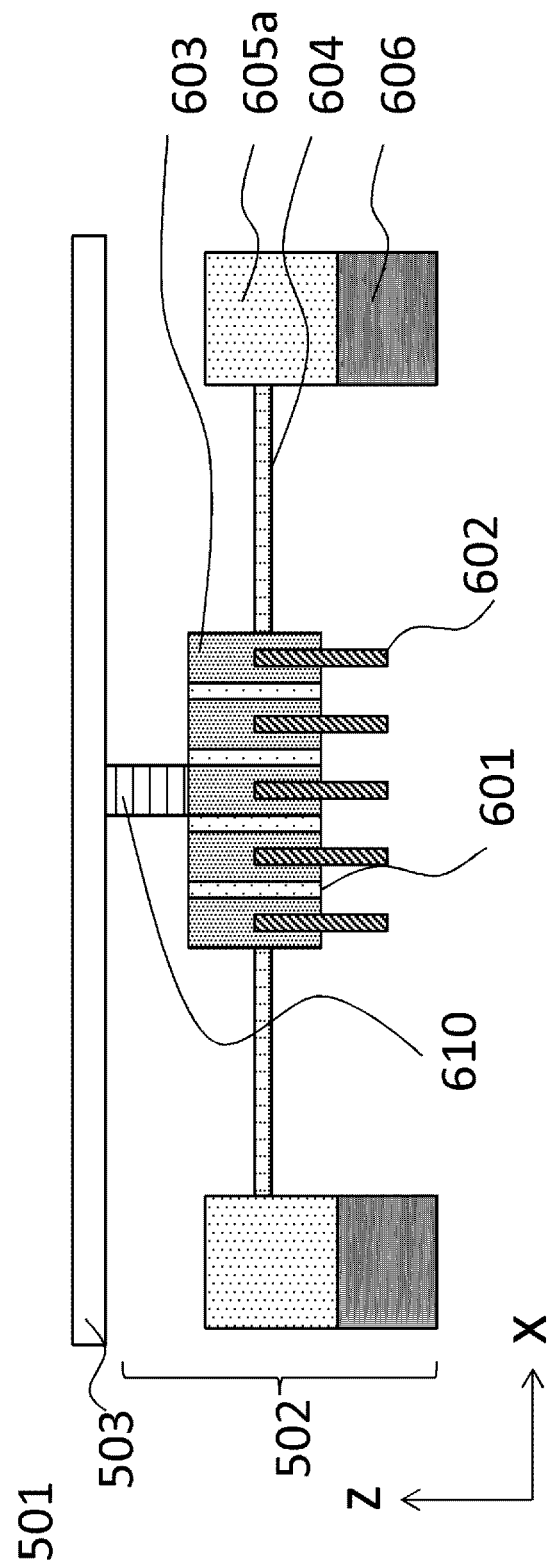
FIG. 6B is a cross-sectional view schematically showing the structure of the first example.

FIG. 6B shows a cross-sectional view of the movable mirror 501 and shows a positional relationship between the movable comb electrode 601 and the stationary comb electrode 602 according to this example. The positional relationship is set such that the movable comb electrode 601 is disposed above the stationary comb electrode 602. In this case, a shift amount is 10 μm. Further, the movable comb electrode 601 and the stationary comb electrode 602 have a width of 10 μm, and the gap between the two electrodes is 5 μm. As shown in the figure, the movable comb electrode 601 and the reflecting portion 503 are located at a predetermined distance in the z-direction, and the stationary comb electrode 602 is not in contact with other members in the z-direction. Thus, even when an electrostatic attractive force occurs and attracts the comb electrodes, any of the comb electrodes does not collide with a member connected to the other comb electrode.

The spring 604 extends in the x-direction from a side wall of the movable portion 603 parallel to the yz-plane and is fixed to a side wall of the supporting portion 605a parallel to the yz-plane. When the movable portion 603 is displaced in a direction other than the z-direction, the movable comb electrode 601 and the stationary comb electrode 602 may interfere. Thus, it is necessary to suppress displacement in a direction other than the z-direction. In this example, the spring has such a shape that the spring expands in the xy-direction, whereby spring constants in the x-direction, the y-direction, and the directions of rotation within the xy, yz, and zx-planes are increased to suppress displacement in these directions. In particular, translation in the y-direction and rotation within the xy and yz-planes can be suppressed by increasing the width of the spring in the y-direction. Specifically, the width of the spring in the y-direction is preferably 1/10 or more of the length in the x-direction and 20 times or more than the thickness of the spring. In this example, the spring 604 has a thickness of 5 μm, a length of 500 μm in the x-direction, and a width of 300 μm in the y-direction.

The post 610 needs to have sufficient rigidity to accurately transfer displacement of the movable portion 603 to the reflecting portion 503. Moreover, the post 610 needs to have such a height that the stationary comb electrode 602 and the reflecting portion 503 do not interfere when the movable portion 603 is moved. In this example, the post 610 has a height of 20 μm.

The stationary comb electrode 602 and the spring 604 are fixed by the supporting portions 605b and 605a, respectively. Different voltages are applied to the movable comb electrode 601 and the stationary comb electrode 602. Thus, an isolation groove 606 is provided so as to electrically isolate the supporting portion 605b that belongs to the stationary comb electrode 602 from the supporting portion 605a that belongs to the movable comb electrode 601. Wires are disposed in the isolated supporting portions 605 and are connected to a voltage control circuit 607.

The reflecting portion 503 has an optically reflecting function of reflecting light to be corrected. The reflecting portion 503 has the reflective surface in order to reflect light. The reflecting portion 503 is disposed so as to cover the actuator portion 502 and is coupled with the actuator portion 502 via the post 610. The reflecting portion 503 has a thickness of 5 μm. The reflecting portion corresponds to a reflecting member of the present invention.

Figure 7A:
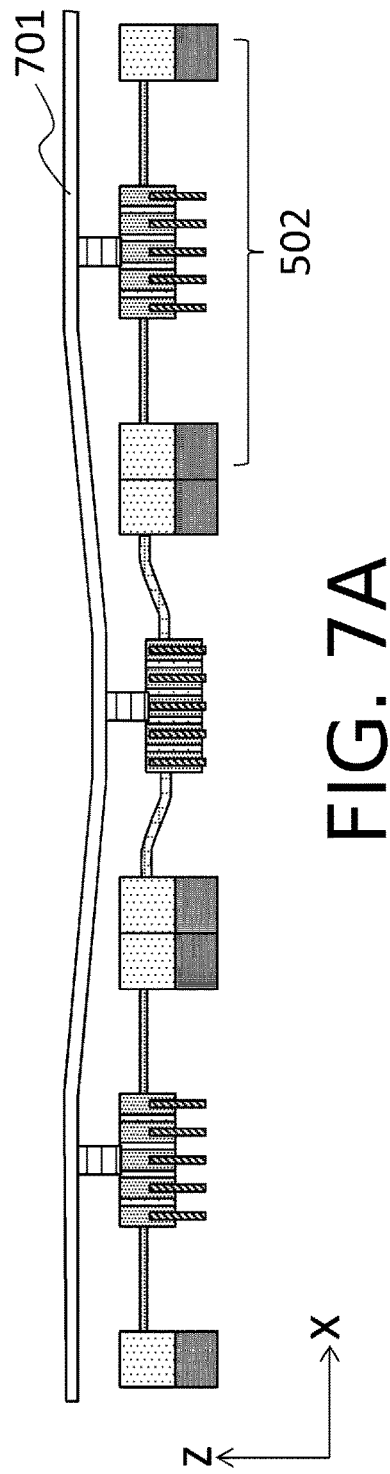
FIGS. 7A and 7B are cross-sectional views showing a structure of a reflecting portion according to the first example.
Figure 7B:
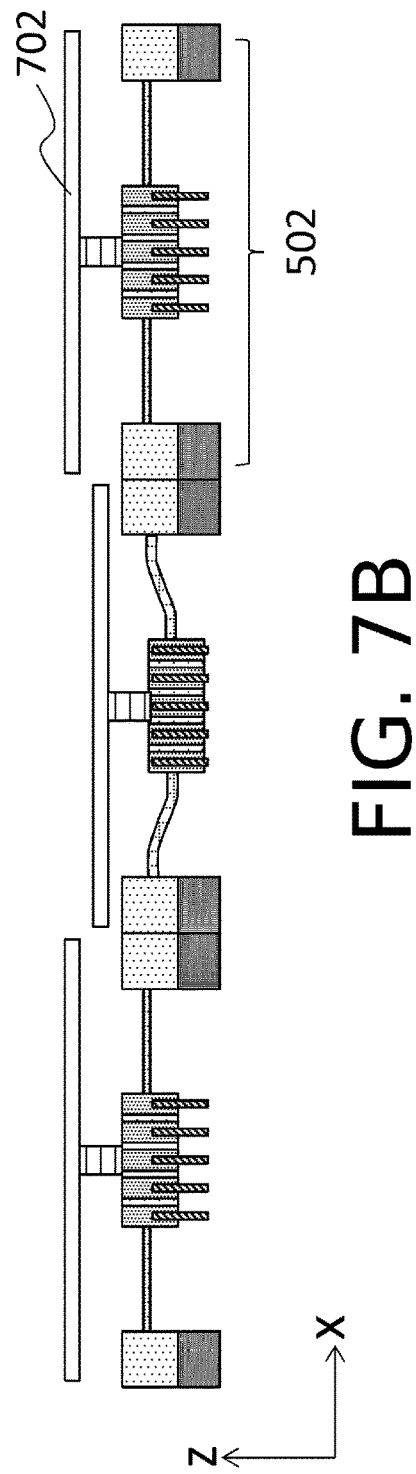

FIG. 7 is a view showing a case where a plurality of actuator portions 502 is disposed. In contrast, the reflecting portion may be a continuous surface 701 that covers the plurality of actuator portions as a whole as shown in FIG. 7A and may be independent surfaces 702 that individually cover the respective actuator portions as shown in FIG. 7B. In this example, the reflecting portion is disposed so as to cover the plurality of actuator portions as a whole. By individually moving the respective actuator portions 501, it is possible to obtain a desired shape. By doing so, since an optical path length of light reflected can be changed by the respective actuator portions 501, the actuator portions can be used as a wavefront correction device.

Next, a method of moving the movable portion 603 will be described with reference to FIG. 8. FIG. 8 is a cross-sectional view of a portion in which the movable comb electrode 601 and the stationary comb electrode 602 are arranged alternately. By applying charges having the opposite signs to the movable comb electrode 601 and the stationary comb electrode 602, it is possible to move the movable comb electrode 601 in the z-direction.

For example, when the movable comb electrode 601 and the stationary comb electrode 602 are disposed as shown in FIG. 8, the following method may be used to move the movable comb electrode 601 downward in the z-direction. First, as in the state immediately after application of a voltage shown in FIG. 8A, when charges having the opposite signs are applied to the movable comb electrode 601 and the stationary comb electrode 602, an electrostatic attractive force (E) is generated, and the electrodes are attracted. As a result, although the movable comb electrode 601 tries to approach the stationary comb electrode 602, since the electrostatic attractive force is evenly distributed to the left and right side in relation to the horizontal direction (the x-direction), the movable comb electrode 601 is displaced downward in the z-direction. In this example, negative charges are applied to the movable comb electrode 601, and positive charges are applied to the stationary comb electrode 602.

Subsequently, a balanced state as shown in FIG. 8B is created. That is, the movable comb electrode 601 stops at such a position that a restoring force (R) of the spring 604 is balanced with the electrostatic attractive force that moves the movable portion 603.

Subsequently, when a potential difference between the movable comb electrode 601 and the stationary comb electrode 602 is set to 0, a state where no charge is applied is created as shown in FIG. 8C. After the voltage is removed, the movable comb electrode 601 returns to its initial position according to the restoring force of the spring 604. A state after this displacement is shown in FIG. 8D.

Although this example describes displacement according to an electrostatic attractive force, displacement may be realized according to an electrostatic repulsive force.

Since the displacement amount can be predicted by measuring an electrostatic capacitance value, feedback control can be performed. In this example, closed-loop control (displacement amount feedback) is performed based on the electrostatic capacitance value of the comb electrode. Further, by controlling the displacement amount of the movable comb electrode 601 that extends in the vertical direction according to feedback control, since it is possible to move both comb teeth equally, it is possible to suppress displacement in the direction of rotation within the yz-plane.

It is necessary to apply individual voltages to the movable comb electrode 601 and the stationary comb electrode 602. In this example, the movable portion 603, the spring 604, and the supporting portion 605 are formed of conductive silicon that is doped with impurities in order to apply voltages to the electrodes. Further, although wires are formed in order to connect these members to the voltage control circuit 607, these wires need to be formed of conductive materials, and in this example, copper is used.

The reflecting portion 503 has an optically reflecting function and needs to have rigidity appropriate for obtaining a desired shape when the reflecting portion 503 is deformed according to movement of the movable portion 603. In this example, the reflecting portion 503 is made up of two layers in which the lower layer is a silicon film that determines the shape of the reflecting portion 503 and the upper layer is a gold thin film that determines a reflecting performance. In this case, the gold thin film becomes the reflective surface.

Various modifications and changes can be made to this embodiment within a range without departing from the spirit of the present invention.

For example, in this example, the movable portion 603, the spring 604, and the supporting portion 605 are formed of silicon that is doped with conductive impurities in order to apply electric potentials to the movable comb electrode 601 and the stationary comb electrode 602. However, rather than forming these member using conductive materials, a method of feeding current by forming wires or feeding current through bonding wires may be used.

Further, the dimensions described above are design matters and thus can be set freely.

Second Example

Figure 9:
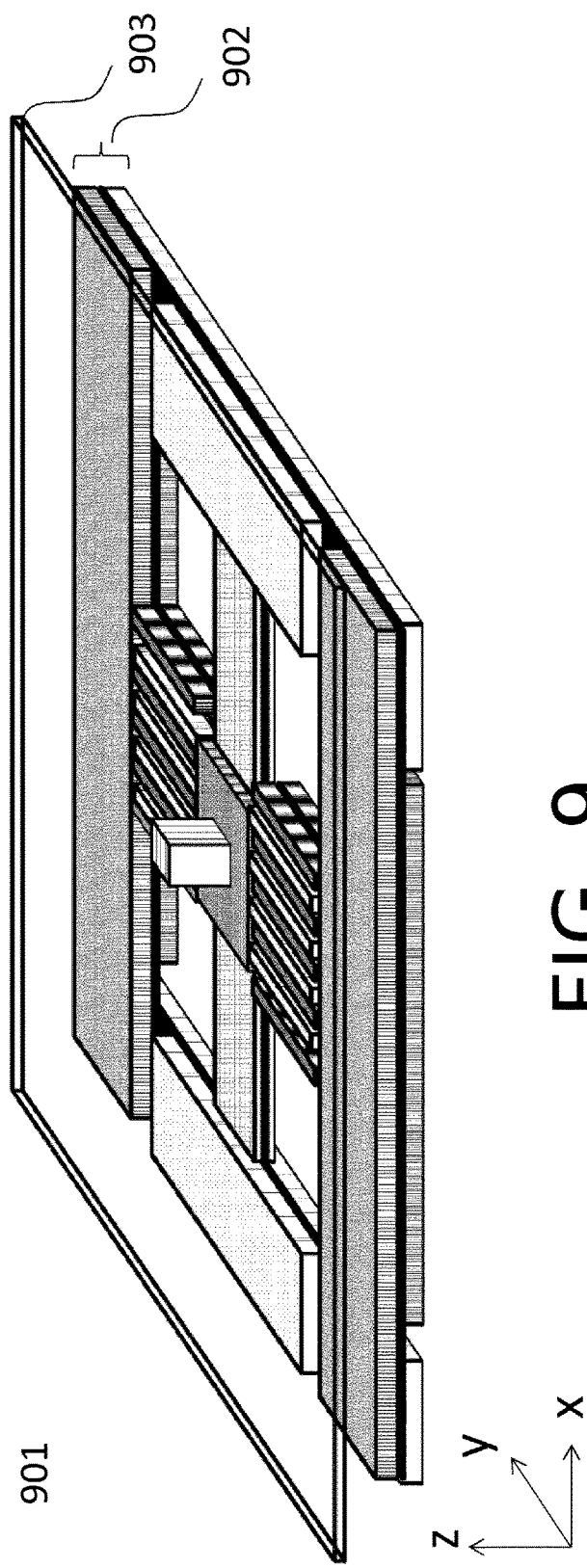
FIG. 9 is a perspective view schematically showing a structure of a second example.

Hereinafter, an electrostatic comb movable mirror according to a second example of the present invention will be described with reference to FIG. 9. Here, FIG. 9 is a perspective view of an electrostatic comb movable mirror 901 according to the second example of the present invention. A movable mirror shown in FIG. 9 includes an actuator portion 902 that has a driving function and a reflecting portion 903 that has a reflecting function.

Figure 10A:
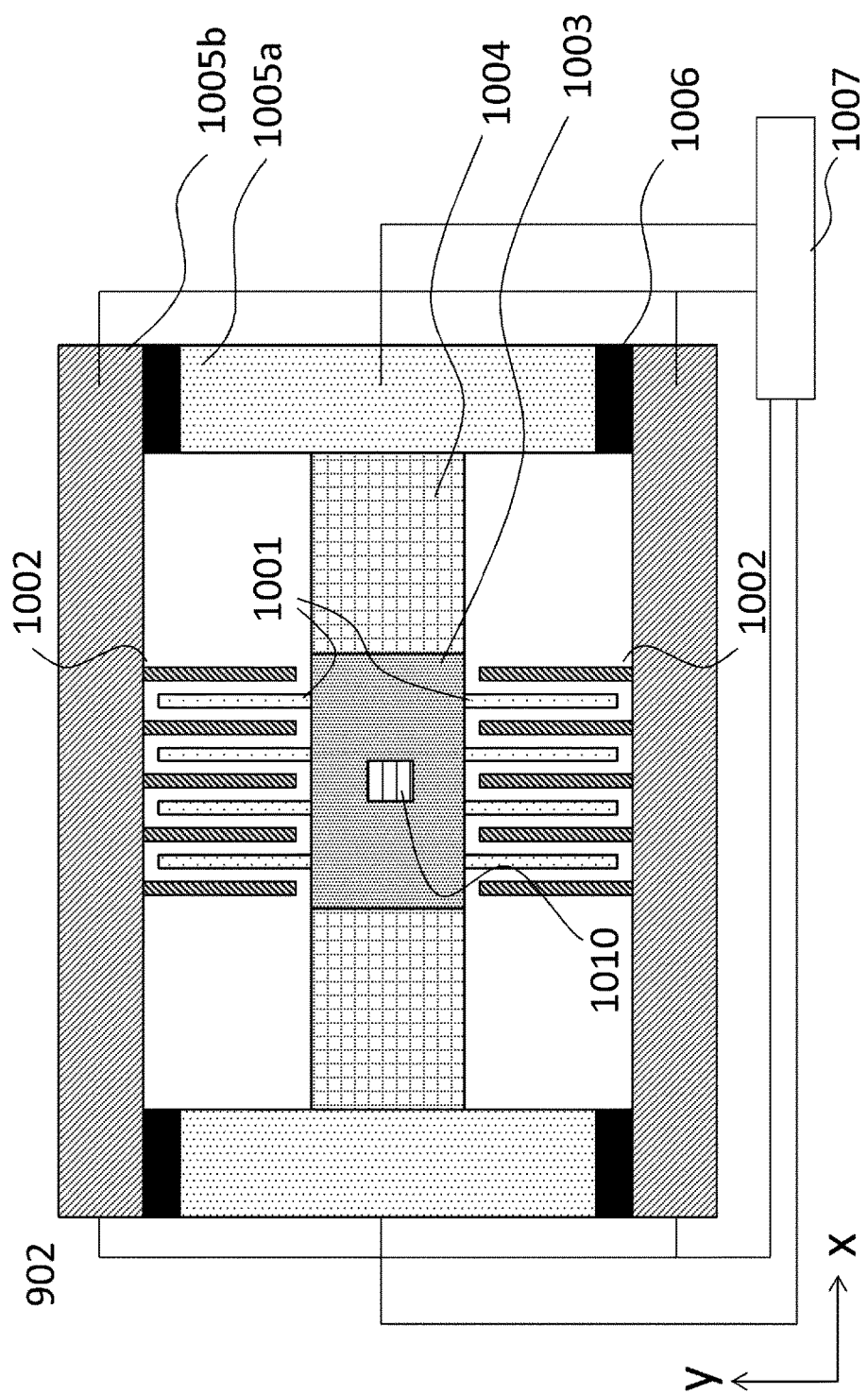
FIG. 10A is a top view schematically showing the structure of the second example.

FIG. 10A shows a top view of the actuator portion 902. In FIG. 10A, a lateral direction of the drawing sheet will be referred to as an x-direction, a longitudinal direction of the drawing sheet will be referred to as a y-direction, and a vertical direction of the drawing sheet will be referred to as a z-direction. An xy-plane shown in the figure is a plane parallel to a substrate. The actuator portion 902 includes a movable comb electrode 1001, a stationary comb electrode 1002, a movable portion 1003, a spring 1004, a supporting portion 1005 (1005a, 1005b), and a post 1010.

The movable portion 1003 is coupled with the spring 1004 and is connected to the movable comb electrode 1001 and the post 1010. One end of the spring 1004 is fixed to the supporting portion 1005a. In this example, the movable portion 1003 has a quadrangular prism shape, the movable comb electrode 1001 is disposed on two surfaces of the four side walls that are parallel to the xz-plane, and the spring 1004 of which one end is fixed to the supporting portion 1005a is coupled with the two surfaces that are parallel to the yz-plane. Further, the post 1010 for transferring displacement of the movable portion 1003 to the reflecting portion 903 is provided on the upper surface.

The movable comb electrode 1001 and the stationary comb electrode 1002 have electrodes that are divided in the z-direction. In this example, the comb electrodes are formed from a silicon-on-insulator (SOI) wafer that includes a Si layer, a $SiO_2$-buried insulation layer, and a Si layer. The wafer has a size of 4 inches, and the respective layers have a thickness of 100 μm for Si layer, 1 μm for $SiO_2$-buried layer, and 100 μm for Si layer.

The movable comb electrode 1001 extends in the y-direction from a side wall of the movable portion 1003 parallel to the xz-plane, and the stationary comb electrode 1002 extends in the y-direction from a side wall of the supporting portion 1005b parallel to the xz-plane. Since the side walls of the movable portion and the supporting portion face each other, the movable comb electrode 1001 and the stationary comb electrode 1002 are disposed to face each other, and the respective comb teeth are arranged alternately. In this example, the movable comb electrode 1001 and the stationary comb electrode 1002 have a thickness of 200 μm and a length of 200 μm. The number of comb electrodes for one actuator is 40 for the movable comb electrode and 42 for the movable comb electrode, and the number of gaps between the comb electrodes is 80.

Since the positional relationship in the z-direction between a side surface of the movable comb electrode 1001 and a side surface of the stationary comb electrode 1002 is different from that of the first example of the present invention, a portion where the comb electrodes do not overlap each other does not necessarily need to be present. This is because in this example, the movable comb electrode 1001 and the stationary comb electrode 1002 are electrically isolated in the z-direction, and a portion where the comb electrodes having the same height do not overlap each other can be created depending on a method of applying a voltage.

Figure 10B:
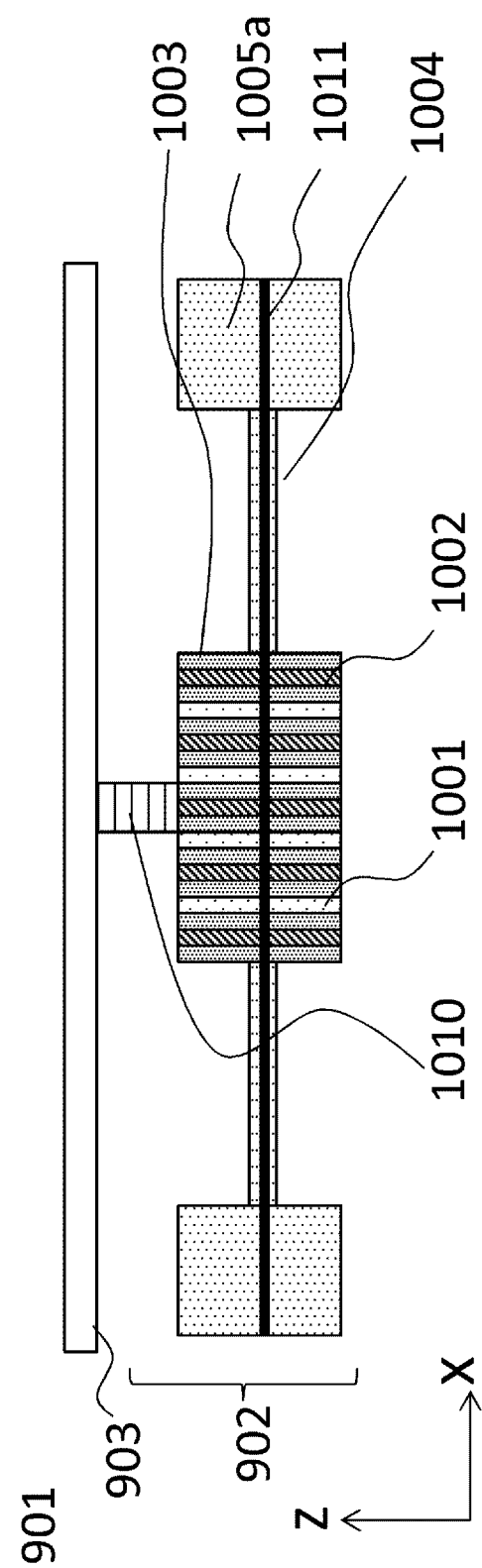
FIG. 10B is a cross-sectional view schematically showing the structure of the second example.

FIG. 10B shows a cross-sectional view of the movable mirror 901 and shows a positional relationship between the movable comb electrode 1001 and the stationary comb electrode 1002 according to this example. The positional relationship is set such that the movable comb electrode 1001 and the stationary comb electrode 1002 are disposed at the same height. That is, the comb electrodes overlap each other in a direction vertical to the reflective surface of the reflecting portion 903. In this example, the movable comb electrode 1001 and the stationary comb electrode 1002 have a width of 10 µm, and the gap between the two electrodes is 5 µm. As shown in the figure, the movable comb electrode 1001 and the reflecting portion 903 are located at a predetermined distance in the z-direction, and the stationary comb electrode 1002 is not in contact with other members in the z-direction. Thus, even when an electrostatic attractive force occurs and attracts the comb electrodes, any of the comb electrodes does not collide with a member connected to the other comb electrode.

The spring 1004 extends in the x-direction from a side wall of the movable portion 1003 parallel to the yz-plane and is fixed to a side wall of the supporting portion 1005a parallel to the yz-plane. When the actuator portion 902 is displaced in a direction other than the z-direction, the movable comb electrode 1001 and the stationary comb electrode 1002 may interfere. Thus, displacement in a direction other than the z-direction needs to be suppressed by the spring 1004. In this example, the spring has such a shape that the spring expands in the xy-direction, whereby spring constants in the x-direction, the y-direction, and the directions of rotation within the xy and yz-planes are increased to suppress displacement in these directions. In this example, the spring 1004 has a thickness of 5 µm, a length of 500 µm in the x-direction, and a width of 300 µm in the y-direction.

The post 1010 needs to have sufficient rigidity to accurately transfer displacement of the movable portion 1003 to the reflecting portion 903. Moreover, the post 1010 needs to have such a height that the stationary comb electrode 1002 and the reflecting portion 903 do not interfere when the movable portion 1003 is moved. In this example, the post 1010 has a height of 20 µm.

The stationary comb electrode 1002 and the spring 1004 are fixed by the supporting portions 1005b and 1005a, respectively. In order to apply different voltages to the stationary comb electrode 1002 and the movable comb electrode 1001, an isolation portion 1006 is provided so as to electrically isolate the supporting portion that belongs to the stationary comb electrode from the supporting portion that belongs to the movable comb electrode. Further, since each of the stationary comb electrode and the movable comb electrode has two electrodes above and below in the z-direction with an insulating layer 1011 interposed, four electrodes are disposed in the actuator portion 902 in total. Wires are disposed in these four divided supporting portions 1003 and are connected to a voltage control circuit 1007.

The reflecting portion 903 has an optically reflecting function of reflecting light to be corrected. The reflecting portion 903 has the reflective surface in order to reflect light. The reflecting portion 903 is disposed so as to cover the actuator portion 902 and is coupled with the actuator portion 902 via the post 1010. The reflecting portion 903 has a thickness of 5 µm. The reflecting portion corresponds to a reflecting member of the present invention.

Figure 11A:
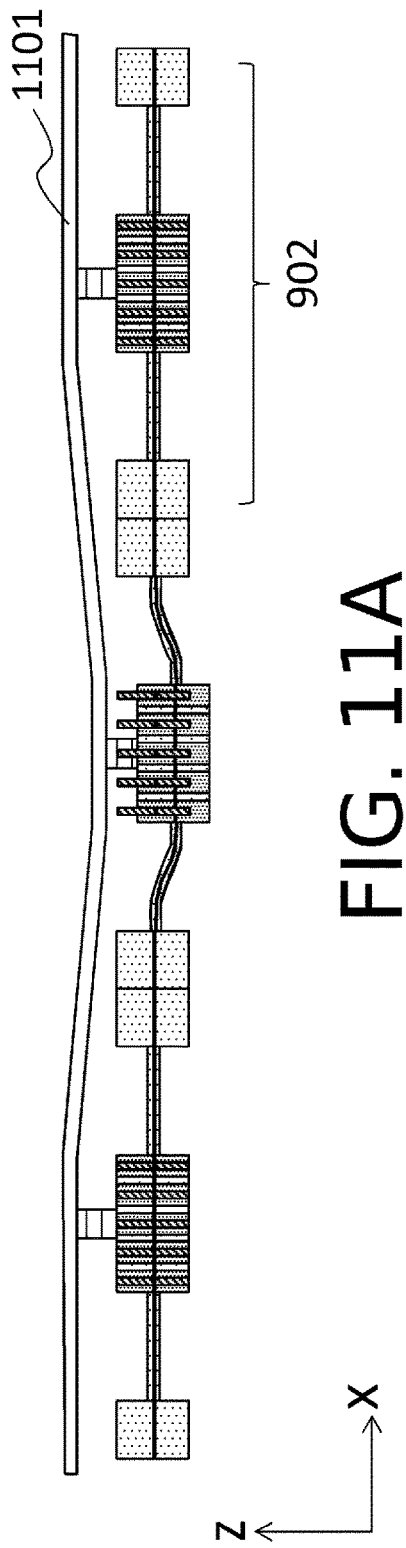
FIGS. 11A and 11B are cross-sectional views showing a structure of a reflecting portion according to the second example.
Figure 11B:
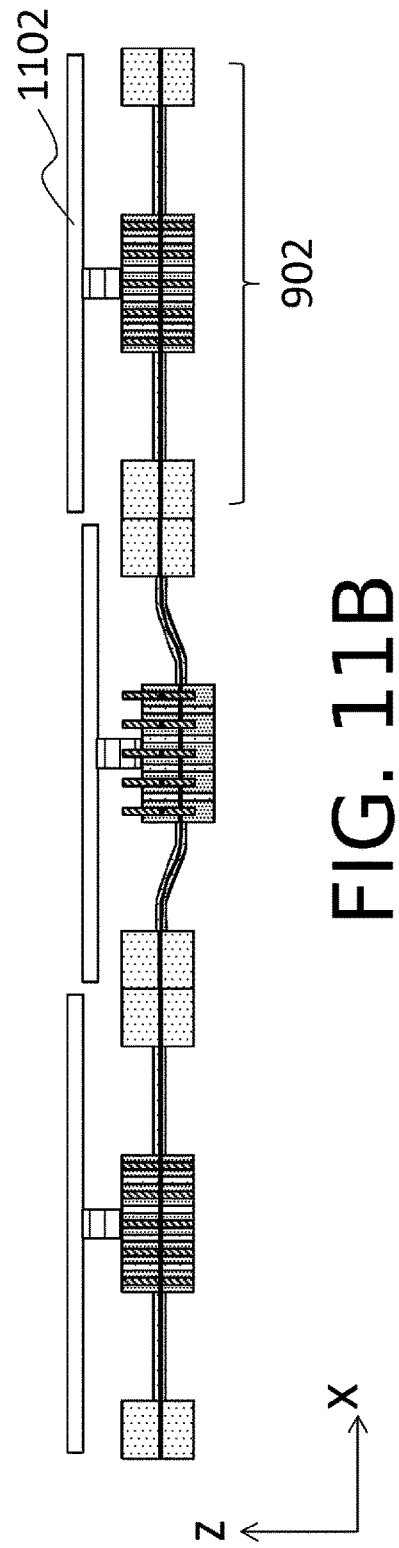
Figure 14:
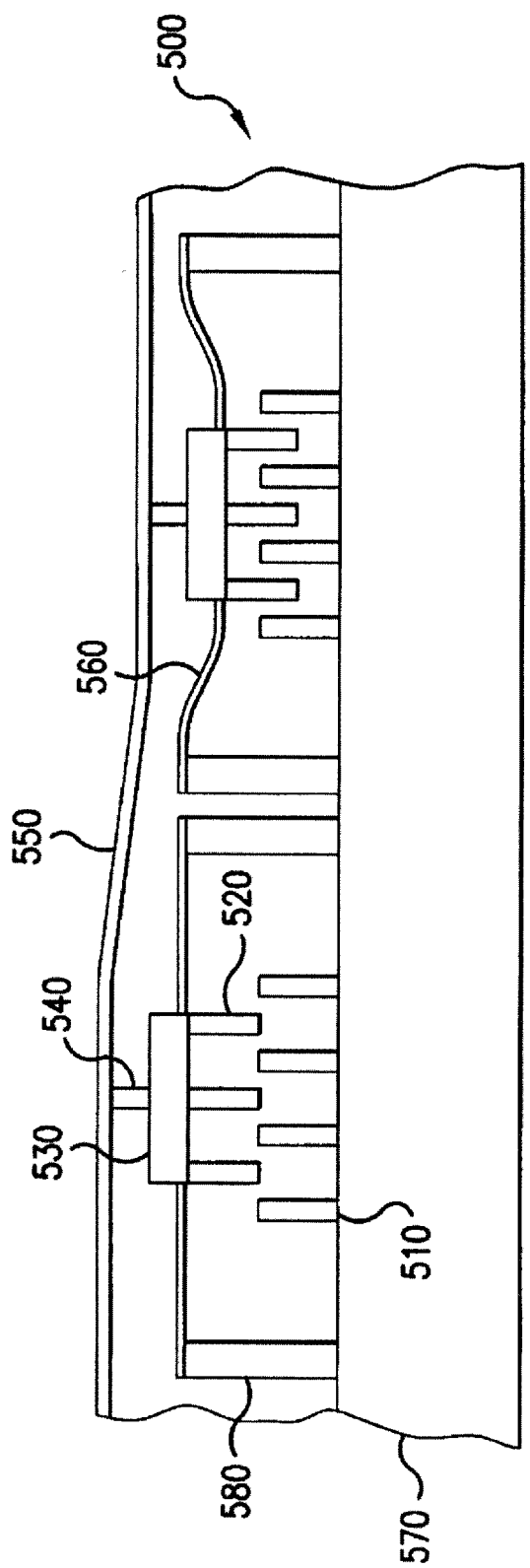
FIG. 14 is a diagram for explaining a conventional technique.

FIG. 11 is a view showing a case where a plurality of actuator portions 902 is disposed. In contrast, the reflecting portion may be a continuous surface 1101 that covers the plurality of actuator portions as a whole as shown in FIG. 11A and may be independent surfaces 1102 that individually cover the respective actuator portions as shown in FIG. 11B. In this example, the reflecting portion 903 is disposed so as to cover the plurality of actuator portions 902 as a whole. By individually moving the respective actuator portions 902, it is possible to obtain a desired shape. By doing so, since an optical path length of light reflected can be changed by the respective actuator portions, the actuator portions can be used as a wavefront correction device.

Next, a method of moving the movable portion 1003 will be described with reference to FIG. 12. FIG. 12 is a cross-sectional view of a portion in which the movable comb electrode 1001 and the stationary comb electrode 1002 are arranged alternately. By applying charges having the opposite signs to the movable comb electrode 1001, the stationary comb electrode 1002, and the electrodes divided in the z-direction, it is possible to move the movable comb electrode 1001 vertically in the z-direction.

For example, the following method may be used to move the movable comb electrode 1001 downward in the z-direction. First, as in the state immediately after application of a voltage shown in FIG. 12A, when charges having the opposite signs are applied to the upper electrode of the movable comb electrode 1001 and the lower electrode of the stationary comb electrode 1002, an electrostatic attractive force (E) is generated, and portions of the electrodes to which charges are applied are attracted. In this example, as shown in FIG. 12A, negative charges are applied to the upper electrode of the movable comb electrode 1001, and positive charges are applied to the lower electrode of the stationary comb electrode 1002. As a result, although the upper electrode of the movable comb electrode 1001 tries to approach the lower electrode of the stationary comb electrode 1002, since the electrostatic attractive force is evenly distributed to the left and right side in relation to the horizontal direction, the upper electrode of the movable comb electrode 1001 is displaced downward in the z-direction.

Subsequently, a balanced state as shown in FIG. 12B is created. That is, the movable comb electrode 1001 stops at such a position that a restoring force (R) of the spring 1004 is balanced with the electrostatic attractive force that moves the movable portion 1003.

Subsequently, when a potential difference between the movable comb electrode 1001 and the stationary comb electrode 1002 is set to 0, a state where no charge is applied is created as shown in FIG. 12C. After the voltage is removed, the movable comb electrode 1001 returns to its initial position according to the restoring force of the spring 1004. A state after this displacement is shown in FIG. 12D.

On the other hand, the following method may be used to move the movable comb electrode 1001 upward in the z-direction. First, as in the state immediately after application of a voltage shown in FIG. 13A, when charges having the opposite signs are applied to the lower electrode of the movable comb electrode 1001 and the upper electrode of the stationary comb electrode 1002, an electrostatic attractive force (E) is generated, and portions of the electrodes to which charges are applied are attracted. In this example, as shown in FIG. 13A, negative charges are applied to the lower electrode of the movable comb electrode 1001, and positive charges are applied to the upper electrode of the stationary comb electrode 1002. As a result, although the lower electrode of the movable comb electrode 1001 tries to approach the upper electrode of the stationary comb electrode 1002, since the electrostatic attractive force is evenly distributed to the left and right side in relation to the horizontal direction, the lower electrode of the movable comb electrode 1001 is displaced upward in the z-direction.

Subsequently, a balanced state as shown in FIG. 13B is created. That is, the movable comb electrode 1001 stops at such a position that a restoring force (R) of the spring 1004 is balanced with the electrostatic attractive force that moves the movable portion 1003.

Subsequently, when a potential difference between the movable comb electrode 1001 and the stationary comb electrode 1002 is set to 0, a state where no charge is applied is created as shown in FIG. 13C. After the voltage is removed, the movable comb electrode 1001 returns to its initial position according to the restoring force of the spring 1004. A state after this displacement is shown in FIG. 13D.

Although this example describes displacement according to an electrostatic attractive force, displacement may be realized according to an electrostatic repulsive force.

Since the displacement amount can be predicted by measuring an electrostatic capacitance value, feedback control can be performed. In this example, closed-loop control (displacement amount feedback) is performed based on the electrostatic capacitance value of the comb electrode. Further, by controlling the displacement amount of the movable comb electrode 1001 that extends in the vertical direction according to feedback control, since it is possible to move both comb teeth equally, it is possible to suppress displacement in the direction of rotation within the yz-plane.

It is necessary to apply individual voltages to the movable comb electrode 1001 and the stationary comb electrode 1002. In this example, the movable portion 1003, the spring 1004, and the supporting portion 1005 are formed of conductive silicon that is doped with impurities in order to apply voltages to the electrodes. Further, although wires are formed in order to connect these members to the voltage control circuit 1007, these wires need to be formed of conductive materials, and in this example, copper is used.

The reflecting portion has an optically reflecting function and needs to have rigidity appropriate for obtaining a desired shape when the reflecting portion is deformed according to movement of the movable portion 1003. In this example, the reflecting portion 903 is made up of two layers in which the lower layer is a silicon film that determines the shape of the reflecting portion and the upper layer is a gold thin film that determines a reflecting performance. In this case, the gold thin film becomes the reflective surface.

Various modifications and changes can be made to this embodiment within a range without departing from the spirit of the present invention.

For example, in this example, the movable portion 1003, the spring 1004, and the supporting portion 1005 are formed of silicon that is doped with conductive impurities in order to apply electric potentials to the movable comb electrode 1001 and the stationary comb electrode 1002. However, rather than forming these member using conductive materials, a method of feeding current by forming wires or feeding current through bonding wires may be used.

Further, the dimensions described above are design matters and thus can be set freely.

The structure of the present invention enables a movable mirror to having a fast response speed, and can be used as a wavefront correction device for adaptive optics which is incorporated in a fundus examination apparatus, an astronomical telescope, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-8935, filed on Jan. 19, 2012, which is hereby incorporated by reference herein in its entirety.

The invention claimed is:

1. An actuator comprising:
a movable portion having a first surface;
a plurality of movable comb electrodes that are supported by a second surface of the movable portion, and extends in a direction parallel to the first surface, wherein the second surface is different from the first surface;
a supporting portion;
a plurality of stationary comb electrodes that are supported by the supporting portion, extends in the direction parallel to the first surface, and are disposed alternately with the plurality of movable comb electrodes;
a spring that connects the movable portion and the supporting portion; and
a voltage controller that applies a voltage to the plurality of movable comb electrodes and the plurality of stationary comb electrodes to displace the plurality of movable comb electrodes and the movable portion in a direction intersecting with the first surface,
wherein the second surface of the movable portion that supports the plurality of movable comb electrodes and a surface of the supporting portion that supports the plurality of stationary comb electrodes are parallel to the direction intersecting with the first surface and face each other,
wherein the voltage controller applies different voltages to the plurality of movable comb electrodes and the plurality of stationary comb electrodes, and
wherein the plurality of movable comb electrodes and the plurality of stationary comb electrodes are disposed to have portions that do not overlap each other in a direction intersecting with the first surface when the voltage controller does not apply a voltage.

2. The actuator according to claim 1,
wherein the plurality of movable comb electrodes are supported by the movable portion in a cantilevered manner to extend in a direction parallel to the first surface,
wherein the plurality of stationary comb electrodes are supported by the supporting portion in a cantilevered manner to extend in a direction parallel to the first surface, and
wherein the second surface of the movable portion that supports the plurality of movable comb electrodes and the surface of the supporting portion that supports the plurality of stationary comb electrodes are disposed to face each other such that the plurality of movable comb electrodes and the plurality of stationary comb electrodes are disposed to alternately engage with each other.

3. A movable mirror comprising:
a plurality of the actuators, wherein each actuator is according to claim 1; and
a plurality of reflecting members connected to the plurality of actuators respectively.

4. The movable mirror according to claim 3, wherein a reflecting member of the plurality of reflecting members and a movable portion are connected via a post.

5. The actuator according to claim 1, wherein, in the direction intersecting with the first surface, a length of the plurality of movable comb electrodes are substantially equal to a length of the plurality of stationary comb electrodes.

6. A movable mirror comprising:
at least one actuator and a reflecting member connected to the at least one actuator, the at least one actuator comprising:
a movable portion having a first surface,
a plurality of movable comb electrodes that are supported by a second surface of the movable portion, and extends in a direction parallel to the first surface, wherein the second surface is different from the first surface,
a supporting portion,
a plurality of stationary comb electrodes that are supported by the supporting portion, extends in the direction parallel to the first surface, and are disposed alternately with the plurality of movable comb electrodes,
a spring that connects the movable portion and the supporting portion, and
a voltage controller that applies a voltage to the plurality of movable comb electrodes and the plurality of stationary comb electrodes to displace the plurality of movable comb electrodes and the movable portion in a direction intersecting with the first surface,
wherein the plurality of movable comb electrodes and the plurality of stationary comb electrodes are disposed to have portions that do not overlap each other in a direction intersecting with the first surface when the voltage controller does not apply a voltage,
wherein the plurality of movable comb electrodes project in a first orientation of the direction intersecting with the first surface toward a portion in which the plurality of movable comb electrodes and the plurality of stationary comb electrodes overlap each other, and
wherein the plurality of stationary comb electrodes project in an opposite orientation of the first orientation of the direction intersecting with the first surface toward the portion in which the plurality of movable comb electrodes and the plurality of stationary comb electrodes overlap each other.

7. An actuator comprising:
a movable portion having a first surface;
a plurality of movable comb electrodes that are supported by a second surface of the movable portion, and extends in a direction parallel to the first surface, wherein the second surface is different from the first surface;
a supporting portion;
a plurality of stationary comb electrodes that are supported by the supporting portion, extends in the direction parallel to the first surface, and are disposed alternately with the plurality of movable comb electrodes;
a spring that connects the movable portion and the supporting portion; and
a voltage controller that applies a voltage to the plurality of movable comb electrodes and the plurality of stationary comb electrodes to displace the plurality of movable comb electrodes and the movable portion in a direction intersecting with the first surface,
wherein the second surface of the movable portion that supports the plurality of movable comb electrodes and a surface of the supporting portion that supports the plurality of stationary comb electrodes are parallel to the direction intersecting with the first surface and face each other,
wherein at least one of the plurality of movable comb electrodes includes a plurality of electrodes that are electrically isolated in a direction intersecting with the first surface,
wherein at least one of the plurality of stationary comb electrodes include a plurality of electrodes that are electrically isolated in a direction intersecting with the first surface, and
wherein the voltage controller applies different voltages to the plurality of electrodes included in the at least one of the plurality of movable comb electrodes respectively and applies different voltages to the plurality of electrodes included in the at least one of the plurality of stationary comb electrodes respectively.

8. The actuator according to claim 7, wherein the plurality of movable comb electrodes and the plurality of stationary comb electrodes are disposed to overlap each other in a direction intersecting with the first surface when the voltage controller does not apply a voltage.

9. An actuator comprising:
a movable portion having a first surface;
a plurality of movable comb electrodes that are supported by a second surface of the movable portion, and extends in a direction parallel to the first surface, wherein the second surface is different from the first surface;
a supporting portion;
a plurality of stationary comb electrodes that are supported by the supporting portion, extends in the direction parallel to the first surface, and are disposed alternately with the plurality of movable comb electrodes;
a spring that connects the movable portion and the supporting portion; and
a voltage controller that applies a voltage to the plurality of movable comb electrodes and the plurality of stationary comb electrodes to displace the plurality of movable comb electrodes and the movable portion in a direction intersecting with the first surface,
wherein the second surface of the movable portion that supports the plurality of movable comb electrodes and a surface of the supporting portion that supports the plurality of stationary comb electrodes are parallel to the direction intersecting with the first surface and face each other,
wherein the actuator further comprises a suppressor that suppresses the plurality of movable comb electrodes and the movable portion from being displaced in a direction other than the direction intersecting with the first surface, and wherein the suppressor suppresses the displacement according to feedback control that is based on electrostatic capacitance values of the plurality of movable comb electrodes and the plurality of stationary comb electrodes.

* * * * *